United States Patent [19]

Fukushige

[11] 4,027,942

[45] June 7, 1977

[54] MICROMETER MICROSCOPE WITH BINOCULAR VIEWING

[75] Inventor: Tatsuzo Fukushige, Osaka, Japan

[73] Assignee: Kogaku Ltd., Osaka, Japan

[22] Filed: Dec. 16, 1975

[21] Appl. No.: 641,591

[52] U.S. Cl. ............................................. 350/10
[51] Int. Cl.² ...................................... G02B 27/32
[58] Field of Search ................. 350/10, 87, 91; 356/171, 251, 252

[56] References Cited

UNITED STATES PATENTS

| | | | |
|---|---|---|---|
| 3,398,631 | 8/1968 | McGivern et al. | 350/10 |
| 3,418,034 | 12/1968 | Ambrose | 350/10 |
| 3,552,819 | 1/1971 | Mandler | 350/10 |
| 3,900,244 | 8/1975 | Wiesler et al. | 350/10 |

Primary Examiner—John K. Corbin
Assistant Examiner—Jon W. Henry
Attorney, Agent, or Firm—Wenderoth, Lind & Ponack

[57] ABSTRACT

A micrometer microscope has a main optical system having a light source, the brightness of which is adjustable, a filter, a condenser lens, an objective lens and binocular eyepieces arranged on an optical axis, and a further optical system having a scale-projecting lens, a negative of a scale, a micrometer connected to the scale, a scale light filter and a scale light source the brightness of which is adjustable, arranged on a further optical axis perpendicular to and intersecting the optical axis of the main optical system. A half mirror is positioned on the optical axis of said main optical system at the point where the optical axes intersect and at an angle thereto for receiving the image of the scale from the further optical system. The magnification of the scale-projecting lens and the magnification of the objective lens is in a ratio of a whole number multiple of 10.

2 Claims, 2 Drawing Figures

MICROMETER MICROSCOPE WITH BINOCULAR VIEWING

The present invention relates to micrometer microscope and to an improvement thereof by which the visibility of a measuring scale is improved and the ease of calculation of the actual size of the object being viewed is increased.

BACKGROUND OF THE INVENTION AND PRIOR ART

As shown schematically in FIG. 1, a conventional micrometer microscope usually has an optical system comprising a light source $Q_1$, a filter $F_1$, a condenser lens C, an objective lens $O_1$ and a Filar micrometer eyepiece ME. In such a system, a sample S is magnified by the objective lens $O_1$ and produces a sample image $S^1$, which is then measured by means of the Filar micrometer eyepiece ME. The value of the measurement thus obtained is divided by the magnification value of said objective lens $O_1$ to determine the actual dimension of the sample S.

With all the recently increasing demand for an optical instrument of this kind capable of measuring extremely fine dimensions of IC, LSI masks and Wafer patterns with the required precision as well as in large numbers, it has become clear that the major disadvantages of such conventional instruments are:

1. The calculation of the actual dimension of the sample is effected with ease when the magnification value of the objective lens $O_1$ is 10 or 100, but it is rather dificult in the case of other values, such as 40 or 60 and the like.

2. In the event that an objective lens of high magnification is used, the contrast of the sample image is necessarily poor as compared with the clear view of the scales seen directly through the eyepiece ME, making it difficult to align the sample image and the scale lines in such a manner that they precisely overlap each other, therefore resulting in a significant decrease in the precision of the measurement.

3. Long hours of monocular observation naturally cause more fatigue that does a similar length of time of binocular observation.

OBJECTS AND BRIEF SUMMARY OF THE INVENTION

It is accordingly an object of the present invention to provide a micrometer microscope which overcomes the disadvantages of the prior art microscopes as described above and in which the object and the scale can be readily compared and in which they are viewed with binocular vision.

It is a further object of the invention to provide a micrometer microscope in which the size of the object can be easily calculated despite the amount of magnification by the objective lens of the main optical system.

These objects are achieved by a micrometer microscope, comprising, in combination, a main optical system having a light source, the brightness of which is adjustable, a filter, a condenser lens, an objective lens and binocular eyepieces arranged on an optical axis, and a further optical system having a scale-projecting lens, a negative of a scale, a micrometer connected to said scale, a scale light filter and a scale light source the brightness of which is adjustable, arranged on a further optical axis perpendicular to and intersecting the optical axis of said main optical system, and a half mirror on the optical axis of said main optical system at the point where said optical axes intersect and at an angle thereto for receiving the image of the scale from said further optical system. In the microscope the magnification of the scale-projecting lens and the magnification of the objective lens is in a ratio of a whole number multiple of 10.

BRIEF DESCRIPTION OF THE FIGURES

The invention will now be described in connection with the accompanying drawings, in which:

As shown in FIG. 2, a binocular microscope has a main optical system comprising a light source $Q_1$, the brightness of which is adjustable, for example by a variable resistor $R_{V1}$, a filter $F_1$, a condenser lens C, an objective lens $O_1$, and eyepieces E set in a binocular tube B. The microscope is further provided with a half mirror H at an appropriate intermediate portion along the optical axis of said main optical system. Mounted adjacent said half mirror and extending perpendicular to said optical axis is a further optical system comprising a scale-projecting lens $O_2$, a negative of a scale N which permits only a beam of light to pass therethrough to project an image of the scale along the optical axis of the further optical system, a micrometer M for the scale N, a filter $F_2$, and a light source $Q_2$. The magnification ratio for the scale-projecting lens $O_2$ and the objective lens $O_1$ of the main optical system is set so as to be 1 : 10 or 1 : 100, for example, $O_2 : O_1 = 4X: 40X$. In addition, the filter $F_2$ is a different color from filter $F_1$, and the brightness of the light of the light source $Q_2$ is made adjustable, by, for example, a variable Resistor $R_{V2}$.

Figure 1:
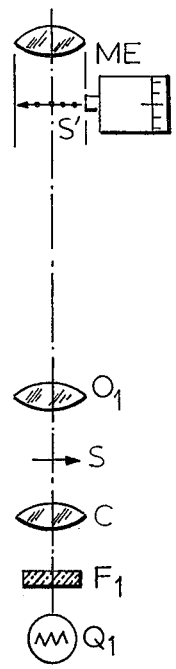
FIG. 1 is a schematic view of a micrometer microscope according to the prior art.
Figure 2:
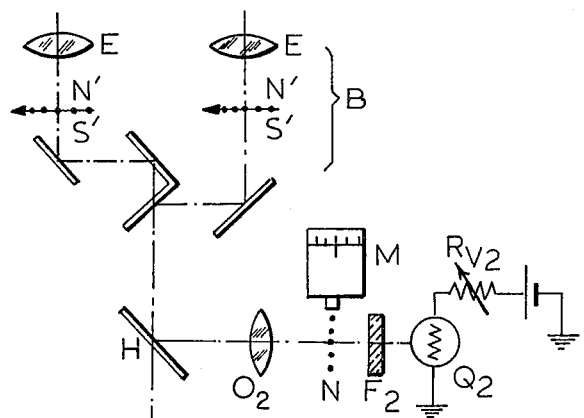
FIG. 2 is a schematic view of a micrometer microscope according to the present invention.
Figure 2:
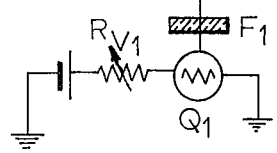

With a microscope as thus constructed, each eye of an observer see the images ($S^1$, $N^1$) of the sample and of the scales, which images are respectively colored differently and overlap at a ratio of 1 : 10 or 1 : 100. Further, the brightness of these images are adjustable, thus successfully eliminating aforementioned disadvantages, which are present with the conventional instruments as follows:

1. The calculation of the actual size is simplified because the actual dimensions are 1/10 or 1/100 of the measured value irrespective of the magnification value of the objective lens.

2. Precise overlapping of the images of the sample and of the scales can be accomplished so that the accuracy of measurement can be significantly improved, because said images are differently colored and the brightness thereof are individually adjustable so as to make possible a similar degree of contrast by viewing them simultaneously.

3. As compared with monocular observation, the binocular observation produces less fatigue in the observer.

While a preferred embodiment of the present invention has been shown and described herein, it is to be understood that the same is not limited thereto but shall cover and include any and all modifications of the invention which fall within the purview thereof.

What is claimed is:

1. A micrometer microscope, comprising, in combination; a main optical system having a light source, means coupled to the light source for adjusting the brightness thereof, a filter, a condenser lens, and a single objective lens in a single line along the optical axis of said system, binocular eyepieces symmetrically arranged with respect to the opticaly axis, and reflecting means on said single line for reflecting the image on said line to both said binocular eyepieces; and a further optical system having a scale projecting lens, a negative of a scale, a micrometer connecter to said negative, a scale light filter and a scale light source arranged on a further optical axis perpendicular to and intersecting the optical axis of said main optical system, further means coupled to said scale light source for adjusting the brightness thereof, and a half mirror on said line on the optical axis of said main optical system at the point where said optical axes intersect and at an angle thereto for receiving the image of the scale from said further optical system and directing it along said line of said optical axis of said main optical system.

2. A micrometer microscope as claimed in claim 1 in which the magnification of the scale-projecting lens and the magnification of the objective lens is in a ratio of a whole number multiple of 10.

* * * * *